United States Patent [19]

Dieulesaint et al.

[11] Patent Number: 4,954,997

[45] Date of Patent: Sep. 4, 1990

[54] SENSOR DEVICE USING LAMB ELASTIC WAVES FOR DETECTING THE PRESENCE OF A LIQUID AT A PREDETERMINED LEVEL

[75] Inventors: Eugène J. Dieulesaint, Saint-Maur; Daniel R. Royer, Sainte-Genevieve des Bois; Olivier R. Legras, Meaux, all of France

[73] Assignee: Materiel et Auxiliare de Signalisation et de Controle Pour L'Automation, Courbevoie, France

[21] Appl. No.: 318,603

[22] Filed: Mar. 3, 1989

[30] Foreign Application Priority Data

Mar. 8, 1988 [FR] France ................... 88 02962

[51] Int. Cl.⁵ ............................ G08B 21/00
[52] U.S. Cl. ........................ 367/13; 367/908; 340/621; 73/290 V
[58] Field of Search ............. 367/908, 118, 13; 340/621; 73/290 V

[56] References Cited

U.S. PATENT DOCUMENTS 4,316,183 2/1982 Palmer et al. ............ 340/621
4,679,430 7/1987 Scott-Kestin et al. ...... 73/290 V
4,735,097 5/1988 Lynnworth ............... 73/290 V Primary Examiner—Thomas H. Tarcza
Assistant Examiner—Daniel T. Pihulic
Attorney, Agent, or Firm—Lawrence M. Nawrocki

[57] ABSTRACT

The sensor device for detecting the presence or absence of a liquid (2) at a predetermined level (N) in a tank (1) comprises a transmitter transducer (51; 51'; 61), a receiver transducer (52, 52', 62), and electronic means (100) for processing the signals applied to the transmission transducer and delivered by the receiver transducer. In the vicinity of the predetermined level (N) of the tank (1), the device includes a detection plate (50; 50', 60) having at least one face (58) which comes into contact with the liquid (2) when the liquid reaches that level. The detection plate carries the transmitter transducer which is disposed for locally generating Lamb waves in the plate, and the plate also carries the receiver transducer which is disposed for detecting the presence or the absence of Lamb waves transmitted along the plate. The receiver transducer is connected to a high gain amplifier whose output is connected to the transmitter transducer so as to form an oscillating closed loop, with oscillations in the loop being interrupted when the liquid reaches the predetermined level (N).

9 Claims, 3 Drawing Sheets

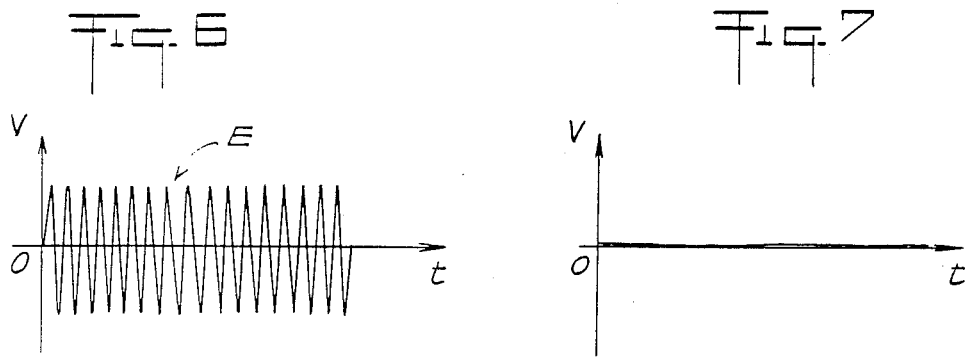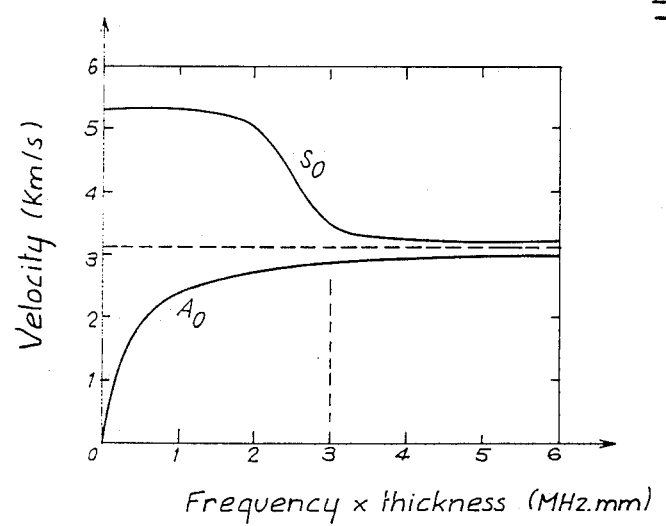

SENSOR DEVICE USING LAMB ELASTIC WAVES FOR DETECTING THE PRESENCE OF A LIQUID AT A PREDETERMINED LEVEL

The present invention relates to a sensor device using Lamb elastic waves for detecting the presence or absence of a liquid at a predetermined level N in a tank, the device comprising: transmitter transducer means; receiver transducer means; and electronic signal processing means for processing the signals applied to the transmitter transducer means and delivered by the receiver transducer means.

BACKGROUND OF THE INVENTION

U.S. Pat. document No. 3,744,301 discloses a device for indicating the level of a liquid in a tank, which device comprises an acoustic wave transmission line placed vertically in a receptacle containing a liquid, the line having a transmitter transducer at a first end for creating a train of elastic waves in the transmission line, and having a second transducer at a second end for delivering a signal in response to the train of elastic waves which is attenuated as a function of the quantity of liquid in contact with the transmission line.

Such a device is difficult to implement since the transducers which are disposed inside the receptacle containing the liquid must be provided with means for protecting them so as to avoid being damaged by the liquid. Further, connections between the transducers and the electronic processing circuits must pass through the walls of the receptacle at the transmitter transducer and at the receiver transducer.

A variant of the above device is known in which the transducers are placed at two opposite ends of the transmission line, and the line and the transducers are disposed substantially in a single horizontal plane. In this case, only one opening need be formed through the side wall of the receptacle in order to mount the device for detecting the level of the liquid. However, given that the transmission line and transducer assembly must be disposed inside the liquid-containing receptacle, the sensor occupies considerable volume inside the receptacle. Further, the sensor includes recesses in which waste or sludge may collect, and this can affect the reliability of the system.

United Kingdom patent documents GB-A-2 137 348 and GB-A-2 076 536 disclose elastic wave sensors in which the transmitter and receiver transducer devices are disposed directly on the wall of a liquid-containing receptacle, or they are coupled to said wall, and they are used to detect the presence of a liquid at a predetermined level in the receptacle. In this case however, the presence or the absence of liquid is determined by detecting an attenuation in the amplitude of the signals received by the receiver transducer, and this makes the device relatively insensitive and unreliable.

The present invention seeks to remedy the abovementioned drawbacks and to provide a device for detecting the presence of a liquid, said device being simple to implement and making it possible to determine reliably whether a given level has been reached by the liquid in a tank.

The invention seeks in particular to provide a device which is compact and can easily be mounted on a tank such as a vat, which has a good sensitivity, and which is reliable even if the inside of the vat containing the liquid whose level is to be detected contains an atmosphere which is very corrosive, or if its temperature is very high, or if the liquid is carrying waste, sludge, or other solid particles.

The invention also seeks to provide a device which does not require openings to be formed through the tank in the vicinity of the level to be monitored.

SUMMARY OF THE INVENTION

These objects are achieved by means of a sensor device as specified at the beginning of the description, and further comprising in the vicinity of said predetermined level N of said tank, a detection plate having at least one face that may come into contact with the liquid, and carrying firstly said transmitter transducer means which are disposed for locally generating Lamb waves in said plate, and secondly said receiver transducer means which are disposed for detecting the presence of the absence of Lamb waves transmitted along said plate; said electronic means being adjusted to excite the transmitter transducer means to generate the first symmetrical mode So of Lamb waves in the plate, and to excite that mode only; the excitation frequency f of the transmitter transducer means being determined in such a manner that the product of the excitation frequency f, expressed in megahertz, multiplied by the thickness e of said plate, expressed in millimeters, is not less than about 2½ and preferably lies in the range 2½ to 3; and said electronic signal processing means include a high gain amplifier whose input is connected to the receiver transducer means and whose output is connected to the transmitter transducer means, thereby forming a closed loop, a filter for allowing said closed loop to oscillate only at said excitation frequency f, and means for detecting the presence of oscillations at said excitation frequency f when the liquid in the tank remains below said predetermined level N.

Using a closed oscillating loop provides on/off operation which is much more reliable than relying merely on a change in amplitude. In order to oscillate, not only must a loop satisfy an amplitude condition, it must also satisfy a phase condition. In addition, the stiffness of an oscillating system can advantageously be modified by changeing the gain in the loop amplifier.

Further, using a well-defined mode of Lamb waves makes it possible to increase reliability of detection.

By way of example, the detection plate is a few millimeters thick and the excitation frequency f of the transmission transducer means is of the order of a few hundreds of kilohertz.

Advantageously, the transmitter transducer means and the receiver transducer means are disposed in the vicinity of said predetermined level N on the outside face of the wall of the tank, which wall constitutes said detection plate.

This disposition greatly simplifies installation and maintenance of the sensor device and makes it possible to increase its lifetime.

In a first-embodiment, the transmitter transducer means and the receiver transducer means are vertically aligned and are disposed on either side of said predetermined level N.

In a second embodiment, the transmitter transducer means and the receiver transducer means are horizontally aligned and each of them overlies said predetermined level N, or is flush therewith.

According to a special feature of the invention, the filter may be constituted by a space filter determined by the transmitter and receiver transducer means, with the transmitter transducer means comprising a plurality of elements which are excited in parallel and spaced apart from one another along the plate by a distance equal to the wavelength λ of the first symmetrical mode So of the Lamb waves which propagate when the transmitter transducer means are excited, and the receiver transducer means also comprising a plurality of elements spaced apart from one another at a distance equal to the wavelength λ of said first symmetrical mode So of the Lamb waves.

In a particular embodiment of the invention, the detection plate is separate from the wall of the tank and is disposed in such a manner as to penetrate vertically into the inside of the tank, with the bottom end of the plate being situated at a small distance beneath said predetermined level N, and with the transmitter transducer means and the receiver transducer means being disposed in the vicinity of the top end of the plate.

BRIEF DESCRIPTION OF THE DRAWINGS

Embodiments of the invention are described by way of example with reference to the accompanying drawings, in which:

FIGS. 6 and 7 show the waveforms of the signal delivered by the receiver transducer means respectively when liquid is absent from and is present at the predetermined level being monitored by the sensor device;

FIG. 8 is a graph showing the phase velocity of the first symmetrical mode So and the antisymmetrical mode Ao in a detection plate made of glass plotted as a function of the product of the excitation frequency of the transmitter transducer means multiplied by the thickness of the detection plate.

DETAILED DESCRIPTION

In order to facilitate understanding the description below, it is initially recalled that elastic waves (also known as acoustic waves) propagate in an isotropic plate in the form either of a shear motion parallel to the faces of the plate, or else in the form of motion including a longitudinal component and a transverse component each perpendicular to the faces of the plate and known as Lamb waves (and also known as plate waves). The resulting displacement of the faces of the plate is either symmetrical or anti-symmetrical about the midplane. The ratio of these two types of components varies with frequency. The two types of component sustain each other mutually since reflection of a longitudinal component gives rise to a transverse component, and vice versa.

Lamb waves may be generated by means of a bulk wave transducer disposed either on the edge of the plate which may be straight or chamfered, or else on a prism coupled to the plate.

A condition for Lamb waves being produced is that the thickness of the plate should be of the same order as the wavelength λ corresponding to the ratio of the phase velocity of the guided wave divided by the frequency of the guided wave.

The principle on which a sensor device in accordance with the invention operates consists in launching Lamb waves locally into a detection plate having at least one face which may come into contact with the liquid, and in detecting these Lamb waves a little further away, at a distance of about 5 cm to 20 cm, for example. In practice, this distance is selected as a function of the sensitivity of the detection plate, which sensitivity is governed, in particular, by the width of the active portion of the plate, which in turn depends on the size of the transducers. When no liquid is in contact with the detection plate over the path of the Lamb waves, the receiver transducer receives the signal. When a liquid is present, the receiver no longer receives a signal since the Lmb waves are no longer reflected by the face of the wall which is in contact with the liquid. The Lamb waves penetrate into the liquid and are "absorbed" thereby, such that the receiver no longer receives the signal or else it receives a signal which is attenuated.

Figure 1:
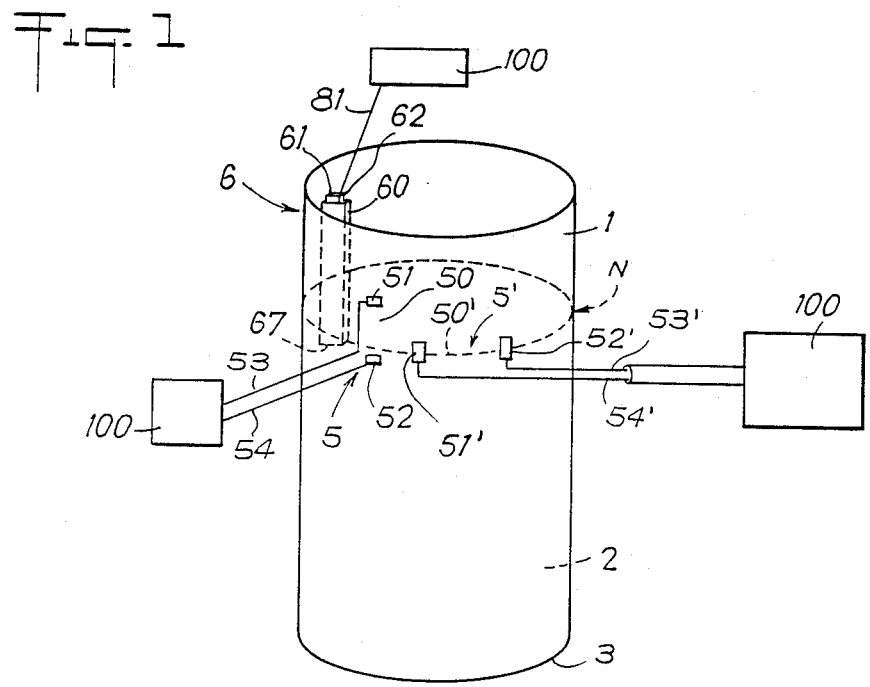
FIG. 1 is a diagrammatic perspective view of a tank to which the present invention is applicable and which includes three different configurations of sensor devices in accordance with the invention.

FIG. 1 is a diagram showing the disposition of the main components of a sensor device in accordance with the invention in a tank 1 having a bottom 3 and containing a liquid 2 whose presence or absence at a predetermined level N is to be detected.

A sensor device 5, 5', or 6 essentially comprises transmitter transducer means 51, 51', 61 and receiver transducer means 52, 52', 62 disposed in the vicinity of the predetermined level N and mounted on a detection plate 50, 50', 60.

For the devices 5 and 5', a portion of the side wall of the tank 1 directly constitutes the detection plate 50, 50', whereas the device 6 uses an independent detection plate 60 which is inserted into the tank 1 from the top thereof and which has a bottom end 67 situated at a small distance, i.e. a few millimeters, beneath the level N.

The sensor device 5 includes a transmitter transducer 51 and a receiver transducer 52 which are vertically aligned, with the receiver transducer 52 being disposed a little beneath the level N, while the transmitter transducer 51 is situated a little above the level N, e.g. at a distance of about 50 cm from the receiver transducer 52. Naturally, the positions of the transmitter and receiver transducers 51 and 52 could be interchanged.

The sensor device 5' comprises a transmitter transducer 51' and a receiver transducer 52' which are horizontally aligned, with each of them being situated so as to be flush with the level N also as to overlie the level N.

The sensor device 6 comprises a transmitter transducer 61 and a receiver transducer 62 both of which are disposed in the vicinity of the top end of the plate 60, which plate is independent from the wall of the tank 1.

In FIG. 1, references 53, 54, 53', 54', and 81 designate connections which are shown symbolically between the transmitter and receiver transducers 51, 52, 51', 52', 61, or 62 and corresponding electronic processor circuits 100 for each of the sensor devices 5, 5', and 6, which electronic circuits may be at a distance from the tank 1.

FIGS. 2 to 5 show various different possible embodiments of the detection plate 50, 60 of the sensor devices 5, 5', and 6, together with the corresponding dispositions of the transmitter or receiver transducers 51, 52, and 62.

Figure 2:
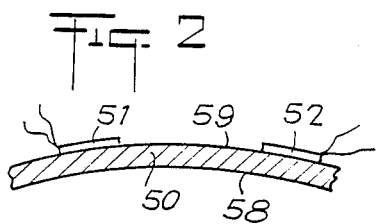
FIGS. 2 to 4 are section views through detector plates provided with transmitter transducer means and with receiver transducer means, in three different variant embodiments, with the sections being taken in planes perpendicular to the main faces of the plate.

FIG. 2 shows the transmitter and receiver transducers 51 and 52 (e.g. of the piezoelectric type) which are in the form of strips glued directly to the outside face 59 of that portion of the wall which constitutes the detection plate 50, with the inside face 58 of that portion possibly coming into contact with the liquid 2.

Figure 3:
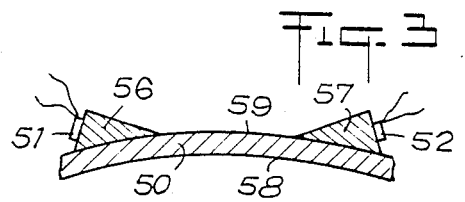
Figure 4:
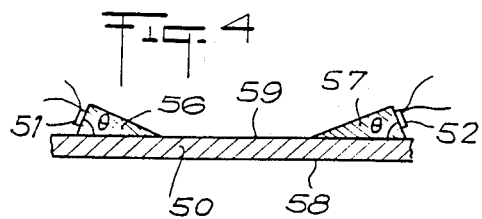

FIGS. 3 and 4 show transmitter and receiver transducers 51 and 52 which may be of the same type as the transducers shown in FIG. 2, but which are disposed on prism-shaped pieces 56 and 57 which are in turn fixed to the outside face 59 of the wall portion which constitutes the detection plate 50. In this case, the angle $\theta$ between a transducer 51 or 52 and the face 59 of the plate 50 is such that:

$$\sin \theta = \lambda_{prism}/\lambda_{plate} = v_{prism}/v_{plate} \qquad (1)$$

where $\lambda_{prism}$ and $\lambda_{plate}$ represent the wavelenght respectively of the longitudinal waves in either of the prisms 56, 57, and of the Lamb waves in the plate 50, while $v_{prism}$ and $v_{plate}$ represent the phase velocity respectively of the longitudinal waves in either of the prisms 56 and 57, and of the Lamb waves in the plate 50.

As can be seen in FIGS. 2 to 4, the device of the invention may be implemented on curved plates 50 (FIGS. 2 and 3) or on plane plates (FIG. 4).

Figure 5:
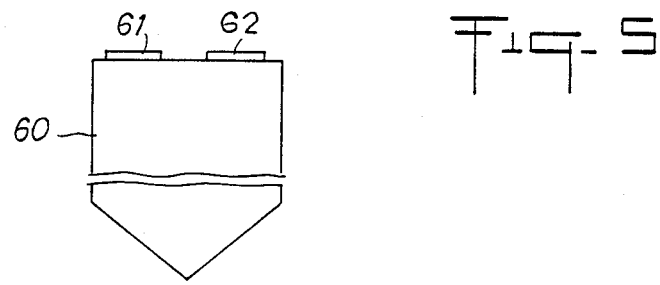
FIG. 5 is a front view of a vertical detection plate provided with transmitter and receiver transducer means at its top end in a possible special embodiment.

When the sensor device 6 comprises a plate 60 which is independent from the wall of the tank 1 and which is inserted vertically into the tank 1, distinct transmitter and receiver transducers 61 and 62 may be placed directly on the straight (FIG. 5) or chamfered edge at the end of the detection plate 60 farthest from its end 67 in the vicinity of the level N (FIG. 1). However, it is possible to place a transducer 61 on a prism 66 which is applied to one of the main faces of the plate 60 in the same way as shown in the embodiments of FIGS. 3 and 4. FIG. 5 shows the case of a vertical detection plate 60 comprising distinct transmitter and receiver transducers 61 and 62 disposed side-by-side on the top plane end face of the plate 60 whose bottom end which may be dipped in the liquid is pointed and has inclined slopes at 45°.

The detection plates 50 and 60 may be made of various types of insulating material such as glass, or else they may be made of metal. When the detection plates are made of metal, it is possible, in particular, to use stainless steels or aluminum alloys such as duralumin.

The width of the detection plate 50 or 60 must be not less than the length of the transducers 51, 52, 61, or 62 which are in the form of bars or plates, and this width may be about 3 centimeters to 8 centimeters, for example.

An important characteristic of the present invention lies in the fact that the electronic means 100 are adjusted to excite the transmitter transducers 51, 51', and 61 in such a manner as to generate the first symmetrical mode So of Lamb waves in the plate 50, 50', and 60, and to excite that mode only, with the excitation frequency f of the transmitter transducers 51, 51', and 61 being determined in such a manner that the product of said excitation frequency f expressed in megahertz multiplied by the thickness e of the plate expressed in millimeters is not less than about 2½, and preferably lies in the range 2½ to 3.

The detection plate 50, 50', or 60 may thus have a thickness of a few millimeters, e.g. 4 mm, whereas the excitation frequency f may be a few hundred kilohertz, e.g. 700 kHz. It is thus possible to use detection plates having a thickness of about 1½ mm, with an excitation frequency of about 2 MHz.

According to the present invention, the sensor device thus makes use of Lamb waves whose phase velocity is relatively low and whose group velocity is close to the minimum, while nevertheless retaining the first symmetrical mode (mode So) on its own, so as to obtain a high degree of sensitivity while nevertheless making use of electronic signal processing devices 100 which are relatively simple in structure.

FIG. 8 is a graph showing the phase velocity (in km/s) of the Lamb waves as a function of the product of the excitation frequency (in MHz) multiplied by the thickness e (in mm) of the detection plate, for plate materials such as glass or duralumin.

FIG. 6 shows the waveform of the signal delivered by a receiver transducers 52, 52' or 62 when there is no liquid in contact with the detection plate at level N in FIG. 1. A large amplitude oscillating signal E can be seen corresponding to closed loop oscillations, with the plate 50, 50', or 60 constituting a delay line in which Lamb waves propagate without disturbance from the transmitter transducer 51, 51', or 60 to the receiver transducer 52, 52', or 62.

FIG. 7 shows the other signal waveform as delivered by a receiver transducer 52, 52', or 62 when liquid comes into contact with the detection plate at level N. Oscillation E shown in FIG. 6 has disappeared because the Lamb wave components have not been able to reflect on the face of the detection plate which is in contact with the liquid.

Figure 9:
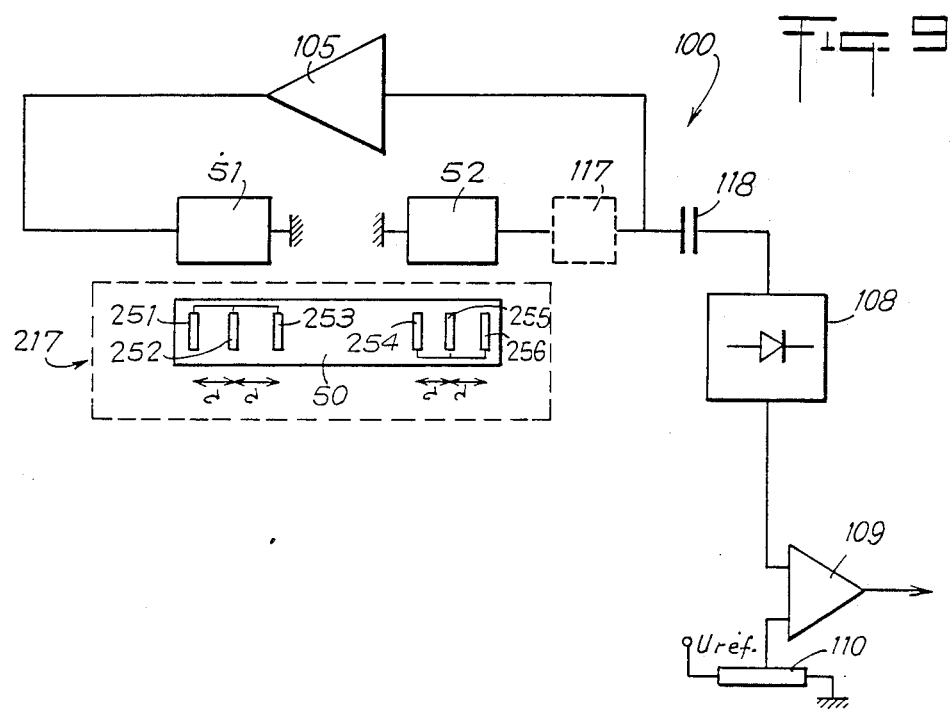
FIG. 9 is a block diagram of electronic circuits in an embodiment of an electronic signal processing device including an oscillating loop and making use of the delay line properties of a detection plate in accordance with the invention.

FIG. 9 shows an embodiment of an electronic signal processing circuit 100 which is combined with the transmitter and receiver transducers 51 & 52, 51' & 52', or 61 placed on the outside wall of the tank 1 or at the end of the plate, and this circuit constitutes an important aspect of the present invention.

In this embodiment, a high gain amplifier 105 has an input directly connected to the receiver transducer 52 and an output directly connected to the transmitter transducer 51 so as to form a closed loop in which the assembly constituted by the transmitter and receiver transducers 51 and 52 and the plate 50 constitute a delay line for Lamb waves connected in cascade with the amplifier 105. The gain of the amplifier 105 is adjusted so as to compensate or overcompensate for losses in the delay line, thereby allowing the system to oscillate. The circuit comprising the amplifier 105, the set of transmitting and receiving transducers 51 and 52, and a filter 117 or 217 may be caused to oscillate at a predetermined frequency f corresponding to the excitation frequency selected for the transmitter transducer 51 when the detection plate 50 is not in contact with the liquid. When the liquid reaches the predetermined level N shown in FIG. 1, and comes into contact with one of the faces of the plate 50, then Lamb wave transmission to the receiver transducer 52 is interrupted and oscillations stop.

The presence or absence of oscillations, e.g. at the output from the receiver transducer 52, may be detected by means of circuits 108 to 110 connected via a coupling capacitor 118 to the transducer 52. The voltage levels available in the oscillation loop, e.g. across the electrodes of the transducer 52 or 61, are applied to a full-wave rectifier circuit 108 which delivers a D.C. voltage signal to one input of a comparator 109 whose other input receives a reference voltage signal $U_{ref}$ provided by a voltage divider bridge 110 from a stabilized D.C. voltage. The output from the comparator 109 provides or does not provide a signal depending on whether the loop is oscillating (FIG. 6) since there is no liquid at the predetermined level N, or else is not oscillating (FIG. 7) because the level of the liquid has risen to level N.

Naturally, the operation of the circuits in FIG. 9 is reversible, and the amplifier 105 associated with the transmitter and receiver transducers 51 and 52, and with the filter 117 or 217 defining a permitted range of oscillation frequencies, returns to sinewave oscillation as soon as the detection plate 50 is no longer in contact with the liquid.

In a particularly advantageous embodiment implementing the electronic circuits of FIG. 9, the transmitter and receiver transducers 51 and 52 may be designed in such a manner as to constitute a space filter 217 which avoids the need to use a conventional electronic filter 117. In this case, the transmitter transducer 51 comprises a plurality of elements 251, 252, 253 which are excited in parallel and which are spaced apart from one another along the plate 50 by a distance equal to the wavelength λ of the first symmetrical mode So of the Lamb waves which propagate when the transmitter transducer 51 is excited; and the receiver transducer 52 likewise comprises a plurality of elements 254, 255, and 256 which are connected electrically in parallel and which may advantageously be equal in number to the number of transmitter transducer elements, with the receiver elements being spaced apart by a distance equal to the wavelength λ of the first symmetrical mode So of the Lamb waves.

In accordance with a special feature, the electronic circuits 100 may include means for allowing the closed loop constituted by the amplifier 105, the delay line constituted by the plate 50 and the transducers 51 and 52, and the filter 117 or 217 to oscillate only during successive limited periods of time. This makes it possible, particularly when using receptacles of small dimensions, to avoid possible latching on delays due to parasitic reflections on the walls of the receptacle. However, it may be observed that such parasitic reflections merely give rise, if the system runs on a permanent basis, to additional modulation of the oscillation without affecting the reliability of the system.

Further, it may be observed that the filter 117 could be constituted in some cases merely by an inductor suitable for defining, together with the associated transducer, an LC circuit having a desired natural frequency of oscillation.

We claim:

1. A sensor using Lamb elastic waves for detecting the presence or absence of a liquid at a predetermined level N in a tank defined by a wall have a thickness e, comprising:

(a) transmitter transducer means located on an external face of a portion of the wall defining the tank, which wall portion comprises a detection plate having an internal face that may come into contact with the liquid, said transmitter transducer means for locally generating Lamb waves in said wall portion;

(b) receiver transducer means located on said external face of said wall portion of the tank proximate the predetermined level N, said receiver transducer means for detecting the presence or absence of Lamb waves transmitted along said wall portion;

(c) electronic signal processing means for processing signals applied to said transmitter transducer means and received by said receiver transducer means, said electronic signal processing means including a high gain amplifier, an input of which is connected to said receiver transducer means, and an output of which is connected to said transmitter transducer means to, thereby, form a closed loop, a filter for allowing said closed loop to oscillate only at an excitation frequency of said transmitter transducer means, and means for detecting the presence of oscillations at said excitation frequency f when liquid in the tank remains below the predetermined level N;

(d) means for adjusting said electronic signal processing means to excite said transmitter transducer means to generate first symmetrical mode So of Lamb waves in said wall portion and to excite that mode only; and (e) a prism-shaped member mounting each of said transmitter transducer means and said receiver transducer means, said prism-shaped members being attached to said wall portion to dispose said transmitter transmitter means and said receiver transducer means at an angle θ to said external face of said wall portion such that $\sin\theta = v\text{prism}/v\text{plate}$, wherein $v$ prism and $v$ plate represent the phase velocities, respectively, of longitudinal waves created in said prism-shaped members and Lamb waves created in said wall portion;

(f) wherein said excitation frequency of said transmitter transducer means is determined as a function of the thickness e of said wall portion in such a manner so that the group velocity of said first symmetrical mode So of the Lamb waves is minimized.

2. A sensor according to claim 1, wherein said filter comprises a space filter determined by said transmitter transducer means and said receiver transducer means, with said transmitter transducer means including a plurality of elements which are excited in parallel and spaced apart from one another along said wall portion by a distance equal to a wavelength λ of said first symmetrical mode So of the Lamb waves which propagate when said transmitter transducer means are excited, and said receiver transducer means also includes a plurality of elements spaced apart from one another at a distance equal to the wavelength λ of said first symmetrical mode So of the Lamb waves.

3. A sensor according to claim 1, wherein said wall portion is a few millimeters thick and said excitation frequency f of said transmission transducer means is of the order of a few hundred kilohertz.

4. A sensor according to claim 1, wherein said transmitter transducer means and said receiver transducer means are vertically aligned and are disposed on either side of said predetermined level N.

5. A sensor according to claim 1, wherein said transmitter transducer means and said receiver transducer means are horizontally aligned, and wherein each overlies said predetermined level N or is flush therewith.

6. A sensor according to claim 1, wherein said wall portion is made of an insulating material such as glass.

7. A sensor according to claim 1, wherein said wall portion is made of a metal such as a stainless steel or an aluminium alloy.

8. A sensor according to claim 1, wherein said wall portion is arcuate.

9. A sensor according to claim 1, wherein said wall portion is planar.